(12) United States Patent
Shih et al.

(10) Patent No.: US 7,940,238 B2
(45) Date of Patent: May 10, 2011

(54) LIQUID CRYSTAL DISPLAY (75) Inventors: Po-Sheng Shih, Yangmei Town (TW);
Hsuan-Lin Pan, Angela Town (TW)

(73) Assignee: Hannstar Display Corporation, Taipei (TW)

( * ) Notice: Subject to any disclaimer, the term of this patent is extended or adjusted under 35 U.S.C. 154(b) by 741 days.

(21) Appl. No.: 11/460,849

(22) Filed: Jul. 28, 2006

(65) Prior Publication Data
US 2008/0024414 A1  Jan. 31, 2008

(51) Int. Cl.
*G09G 3/36* (2006.01)
(52) U.S. Cl. .......................................... 345/92; 345/207
(58) Field of Classification Search .................. 345/173, 345/174, 175, 207, 87, 92
See application file for complete search history.

(56) References Cited

U.S. PATENT DOCUMENTS

| | | | |
|---|---|---|---|
| 7,323,718 B2 * | 1/2008 | Chen et al. | 257/72 |
| 2003/0156087 A1 | 8/2003 | Boer et al. | |
| 2003/0179323 A1 * | 9/2003 | Abileah et al. | 349/24 |
| 2004/0160404 A1 * | 8/2004 | Nakajima et al. | 345/96 |

* cited by examiner

*Primary Examiner* — Chanh Nguyen
*Assistant Examiner* — Jonathan Blancha
(74) *Attorney, Agent, or Firm* — Volpe and Koenig, P.C.

(57) ABSTRACT

A novel method for driving the data signal transmission and the photo signal readout in a pixel of a display as well as the novel pixel structure corresponding thereto is provided to overcome the lightness uniformity issue of the conventional touch sensitive display resulting from the configuration of readout line. In the present invention, the exclusive readout line for signal readout is not necessary anymore, and through the well-designed configuration for the novel pixel, the data line carrying on a data signal would transmit a photo signal to be read out and processed as well.

18 Claims, 14 Drawing Sheets

LIQUID CRYSTAL DISPLAY

FIELD OF THE INVENTION

The present invention relates to a method for driving a display and the pixel structure corresponding thereto, and in particular to a method for driving a data line included in the pixel structure for signal transmission and/or signal readout.

BACKGROUND OF THE INVENTION

Figure 1:
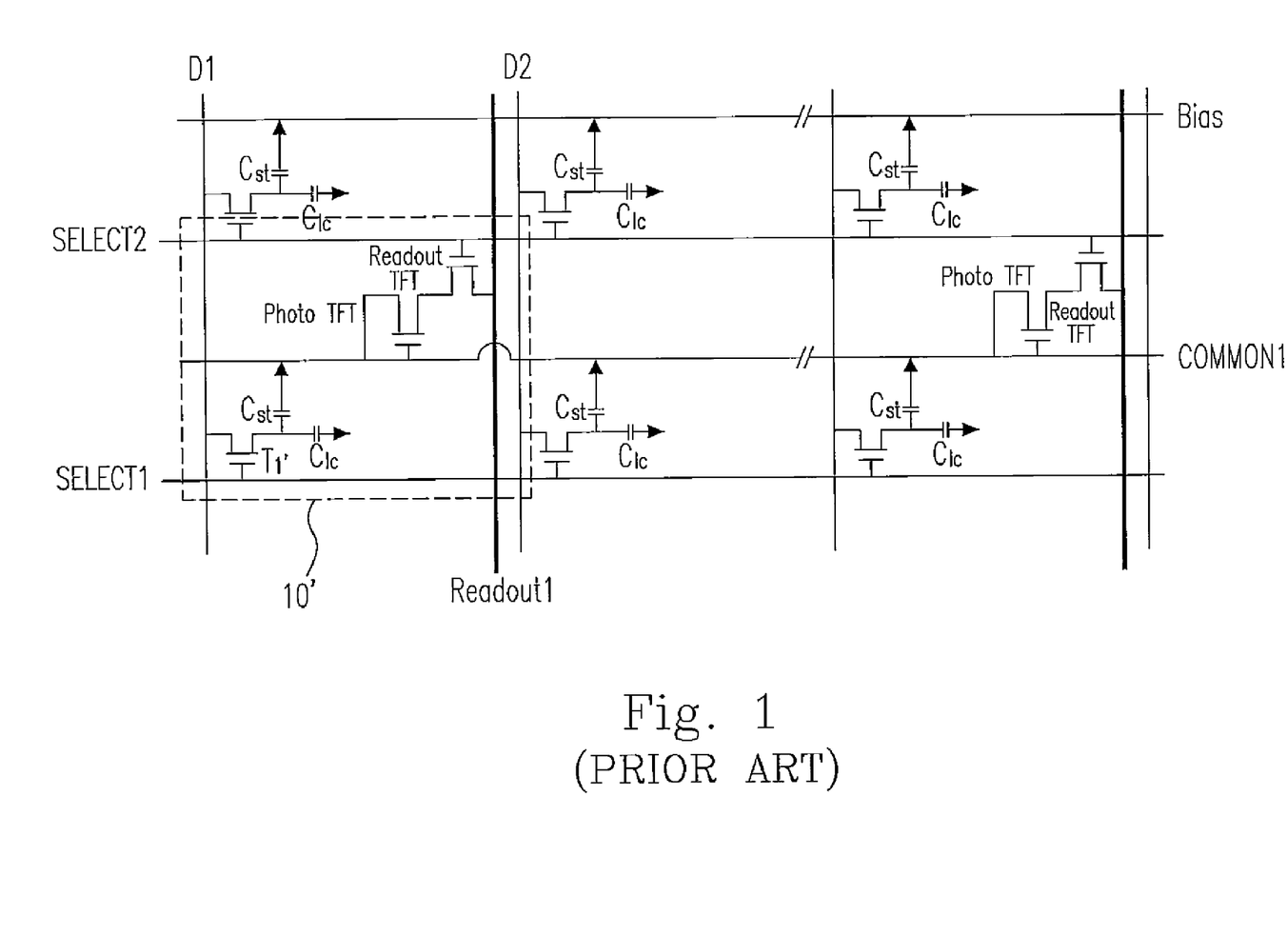
FIG. 1 is a diagram illustrating the pixel structure of a conventional touch display according to the prior art.

Regarding the existing technique for touch sensitive displays, it always needs to configure an exclusive conducting line for signal/data readout, i.e. the readout line, in the pixel of the display. With reference to FIG. 1, which is a diagram illustrating the pixel structure of a conventional touch display according to the prior art, the pixel 10' is defined by a pair of data lines D1, D2 and a pair of gate lines SELECT1, SELECT2, where the respective data signal is transmitted through the data lines D1 and D2. The pixel 10' includes a first transistor T1' for display, whose gate terminal is electrically connected to the gate line SELECT1. The source terminal of the first transistor T1' is electrically connected to the data line D1, and the drain terminal thereof is electrically connected to the common line COMMON1, which is provided with a biased voltage, through a capacitor Cst. The photo element, e.g. the Photo TFT, is configured for generating a photo signal, and the second transistor, Readout TFT, electrically connected thereto provides the control for reading out the photo signal. In this case, the second transistor Readout TFT is electrically connected to a readout line, Readout1, and is controlled to be switched on by a gate pulse provided by the gate line SELECT2, so that the photo signal could be transmitted through the readout line Readout1.

Figure 2:
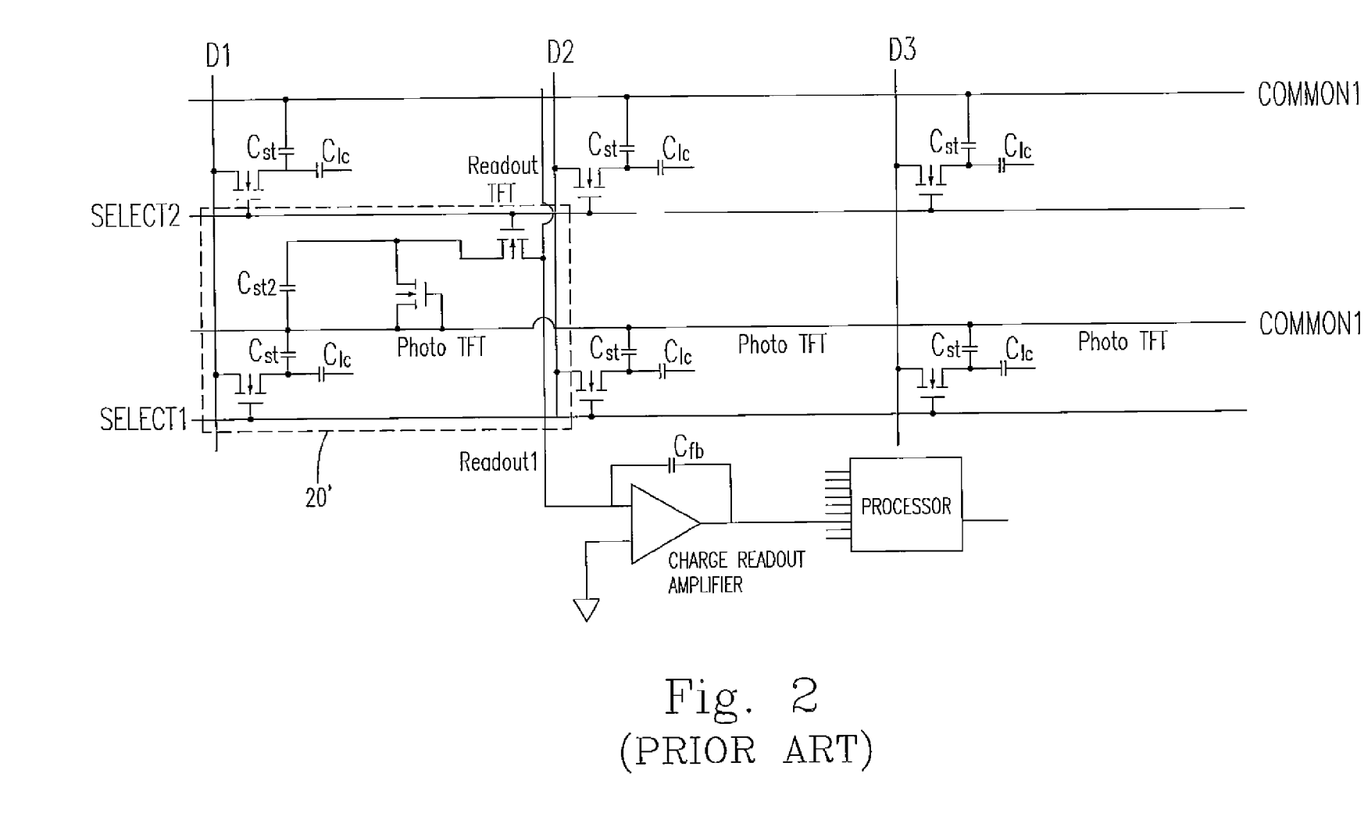
FIG. 2 is a diagram illustrating the pixel structure of a further conventional touch display according to the prior art.

Please refer to FIG. 2, which is a diagram schematically showing the equivalent circuit for the pixel of a further conventional touch sensitive display as provided in US patent application No. 2003/0156087. The photo-sensitive structure therefor, i.e. a pixel structure, mainly includes a photo thin film transistor (Photo TFT) interconnected to a readout thin film transistor (Readout TFT) and a further capacitor which interconnects the common line to the transistors, and the circuit therefor is operated in the charge mode. The pixel 20' defined by data lines D1, D2 and gate lines SELECT1, SELECT2 is addressed by applying a voltage to the gate line, SELECT1, which switches the transistors on and allows the charges from the data lines to flow. Also, the Readout TFT is controlled by a gate pulse applied on a previous gate line, SELECT2, so as to control the photo signal readout for the pixel 20', and the capacitor Cst2 interconnecting the common line, COMMON1, to the transistors is configured for signal storage. With respect to such configuration, in order to transmit the generated photo signal to an external circuit for being processed, the pixel 20', also needs a further conductive line therefor, i.e. the readout line Readout1, so as to exclusively transmit the photo signal to be read. The readout line Readout1 is electrically connected to an external amplifier, so that the transmitted photo signal would be amplified thereby and then output to a processor for subsequent data determination and process, whereby the data display and the input operation for such conventional touch sensitive display is performed.

Figure 3A:
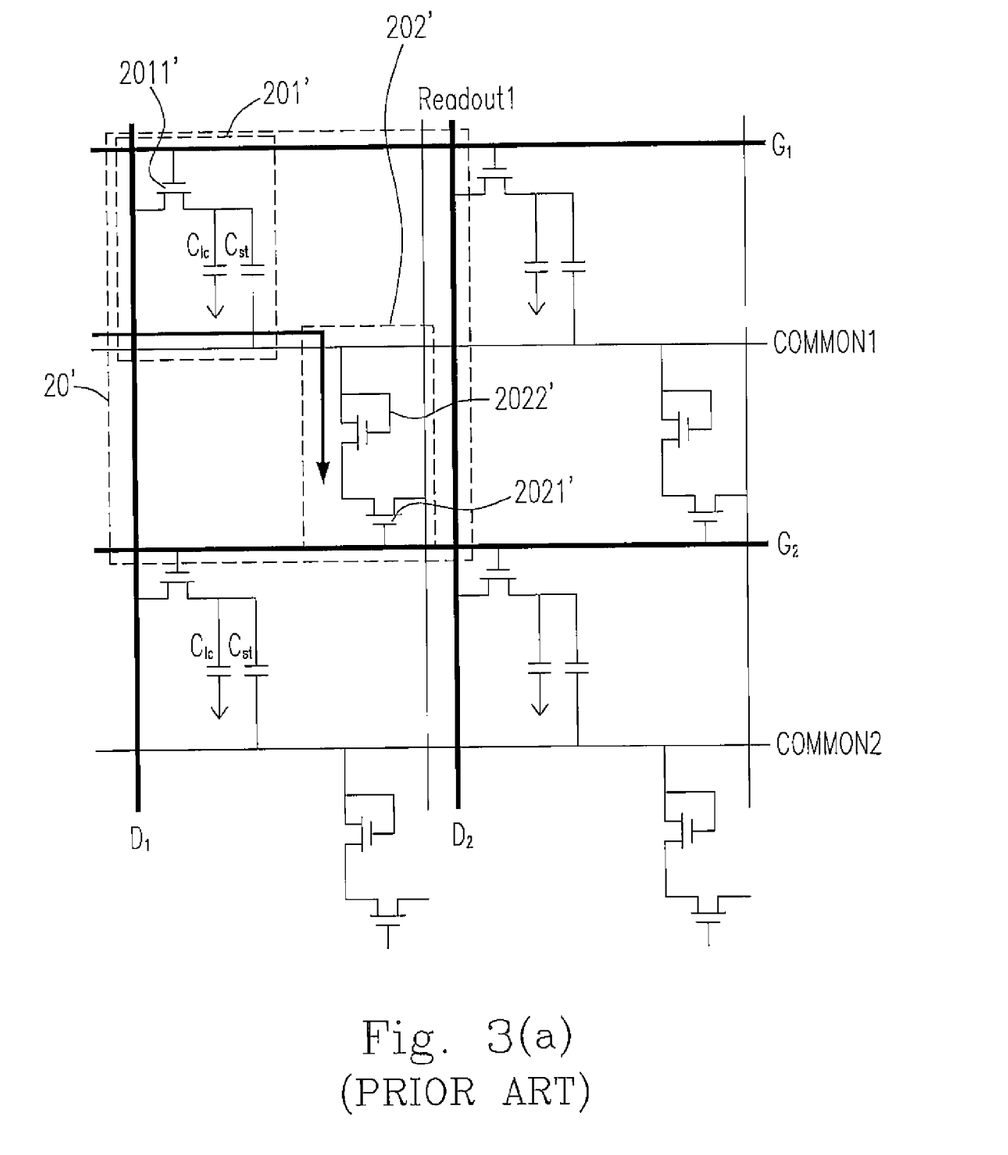
FIG. 3(a) is a diagram schematically showing the equivalent circuit for the pixel structure.

Please refer to FIG. 3(a), which is a diagram schematically showing the equivalent circuit for the pixel of a further conventional touch sensitive display. In this case, the pixel 20' is defined by a first and a second gate lines G1, G2, and a first and a second data lines D1, D2 intersecting to each other. Furthermore, a readout line Readout1 is disposed between the first and the second data lines D1, D2 and passing through the pixel 20', while a common line COMMON1 is disposed between the first and the second gate lines G1, G2, for electrically connecting each data lines of the pixel 20'. Moreover, there are two main parts, i.e. a pixel element 201' and a photo element 202' formed therein. In more specifics, the pixel element 201' includes a photo TFT 2011' having a first gate electrode connected to the first gate line G1, a first drain electrode connected to the first data line D1, and a first source electrode connected to the common line COMMON1. The photo element 202' includes a switch TFT 2021' having a second gate electrode connected to the second gate line G2, a second drain electrode, and a second source electrode connected to the readout line Readout1. Furthermore, the photo element 202' further includes a photo TFT 2022' having a third gate electrode and a third drain electrode, both of which are connected to the common line COMMON1, and a third source electrode connected to the second drain electrode of the switch TFT 2021'.

Figure 3B:
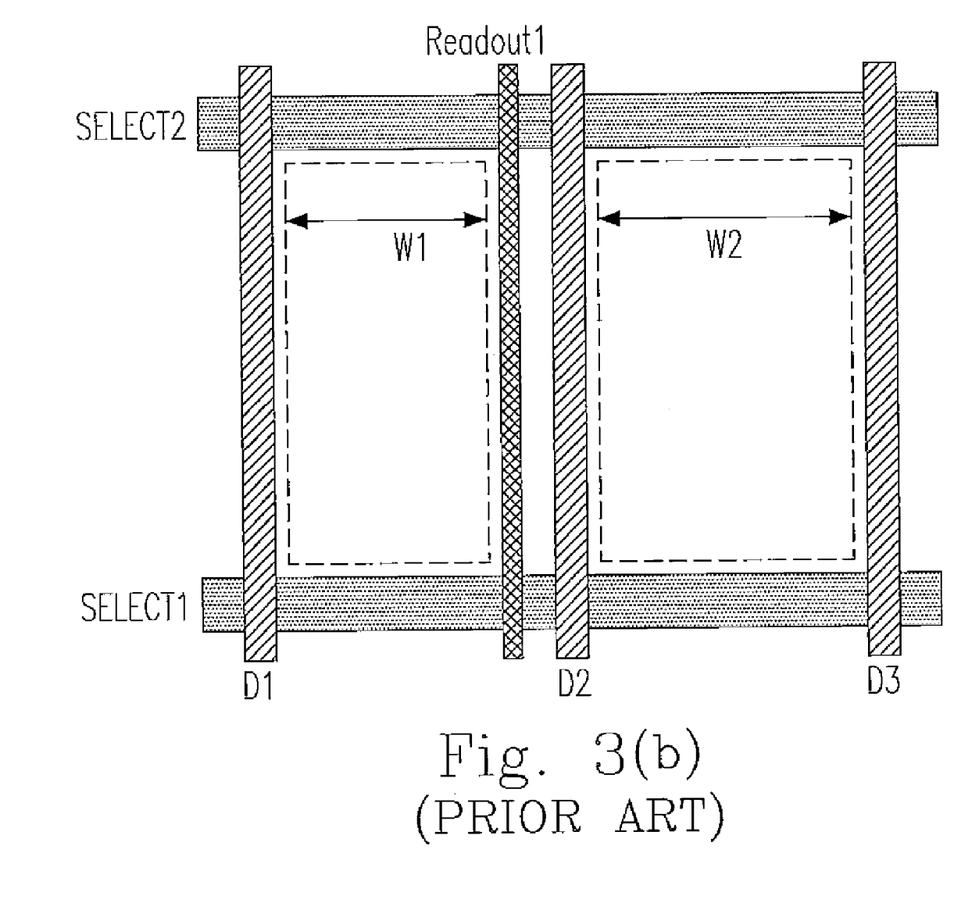
FIG. 3(b) is a diagram schematically illustrating the configuration of readout line therein.

The configuration of readout line results in a disadvantage for image display. Please refer to FIG. 3(b), which is a diagram schematically illustrating the configuration of readout line Readout1 in the pixel of the mentioned touch sensitive display according to the prior art. Since the additional readout line Readout1 is essential for the photo signal transmission in such a configuration, which occupies a specific portion of active area of the display, the aperture ratio of the pixel having such readout line Readout1 is thus different from that of other pixels, i.e. W1<W2, as shown in FIG. 3(b). Therefore, the mentioned touch sensitive display is relatively disadvantageous in a non-uniform lightness resulting from the difference of aperture ratio.

In addition, the configuration of such readout line also brings a test defect for the display easily and causes the loss in yield accordingly, which may result in a relatively high production cost and a relatively poor display property thereof.

In order to overcome the mentioned issues of the conventional touch sensitive display, so as to further improve the uniformity of lightness therefor, a novel method for driving the signal transmission and readout in a pixel thereof as well as the novel pixel structure corresponding thereto is provided.

SUMMARY OF THE INVENTION

In accordance with a first aspect of the present invention, a novel pixel structure is provided, which is advantageous in that no exclusive readout line needs to be configured therein for data transmission and/or data readout.

According to the first aspect of the present invention, the pixel structure includes a first data line and a second data line located adjacent thereto, a first gate line and a second gate line located adjacent thereto, a common line located between the first gate line and the second gate line, a first transistor, a photo element and a second transistor. The first transistor serving for display has a first terminal electrically connected to the first gate line, a second terminal electrically connected to the first data line, and a third terminal electrically connected to the common line through a first capacitor. The photo element, serving for generating a photo signal, has a first terminal and a second terminal, where the first terminal thereof is electrically connected to the common line. The second transistor has a first terminal electrically connected to the second gate line, a second terminal electrically connected to the second terminal of the photo element, and a third terminal electrically connected to the second data line, so that the readout of the photo signal is controllable thereby.

Preferably, the second data line is further electrically connected to a data driver on one end and to a readout circuit on the other end.

Preferably, the data driver includes a driving integrated circuit and a switch configured therein, and the second data line is electrically connected thereto.

Preferably, the readout circuit includes an amplifier.

Preferably, the second data line is electrically connected to the data driver through a first switch, and the first switch is fabricated on a substrate of the display.

Preferably, the second data line is electrically connected to the readout circuit through a second switch.

Preferably, a data signal from the data driver is transmitted through the second data line when the readout circuit is electrically decoupled therewith by the second switch.

Preferably, the photo signal is transmitted to the readout circuit for being read out and processed thereby through the second data line when the data driver is electrically decoupled therewith by the first switch.

Preferably, the photo element is one of a photo transistor and a photo diode.

Preferably, the common line is provided with a biased voltage.

Preferably, the biased voltage is a negative voltage.

According to the first aspect of the present invention, the pixel structure further includes a second capacitor electrically connected between the common line and the photo element.

In accordance with a second aspect of the present invention, a method for driving a pixel of a display, especially a touch display, is provided. The pixel includes at least a data line for signal transmission and/or signal readout, at least a gate line, a photo element for generating a photo signal and a first switch electrically connected thereto. In addition, the data line is electrically connected to a data driver on one end thereof. Through the provided method, the pixel is advantageous in that no further readout line needs to be configured therein for the signal transmission and/or readout.

The provided method includes steps of (a) providing a control signal of a first state to the data driver for electrically coupling the data line with a data driver, whereby a data signal from the data driver is transmitted through the data line into the pixel, and (b) providing a control signal of a second state to the data driver for electrically coupling the data line with an amplifier, whereby the photo signal is transmitted to the readout circuit for being read out and processed.

According to the second aspect of the present invention, the data line is electrically decoupled with the readout circuit when the data line is provided with the control signal of the first state.

Preferably, the first state of the control signal is a low state.

According to the second aspect of the present invention, the data line is electrically decoupled with the data driver when the data line is provided with the control signal of the second state.

Preferably, the second state of the control signal is a high state.

According to the second aspect of the present invention, the photo signal is transmitted when the first switch is provided with a gate pulse having a first portion corresponding to the second state of the control signal through the gate line.

Preferably, the data driver serves for holding the data signal when the photo signal is transmitted through the data line.

The foregoing and other features and advantages of the present invention will be more clearly understood through the following descriptions with reference to the drawings, wherein:

BRIEF DESCRIPTION OF THE DRAWINGS

FIGS. 3(a) and 3(b) are diagrams illustrating the pixel structure of still a further conventional touch display according to the prior art, wherein

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

In the present invention, the exclusive readout line for signal readout is not necessary anymore, and through the well-designed configuration for the novel pixel, the data line carrying on a data signal would transmit a signal to be read as well. In this respect, the present invention provides a method for driving the novel pixel for the touch display, which is illustrated with an equivalent circuit therefor.

Figure 4:
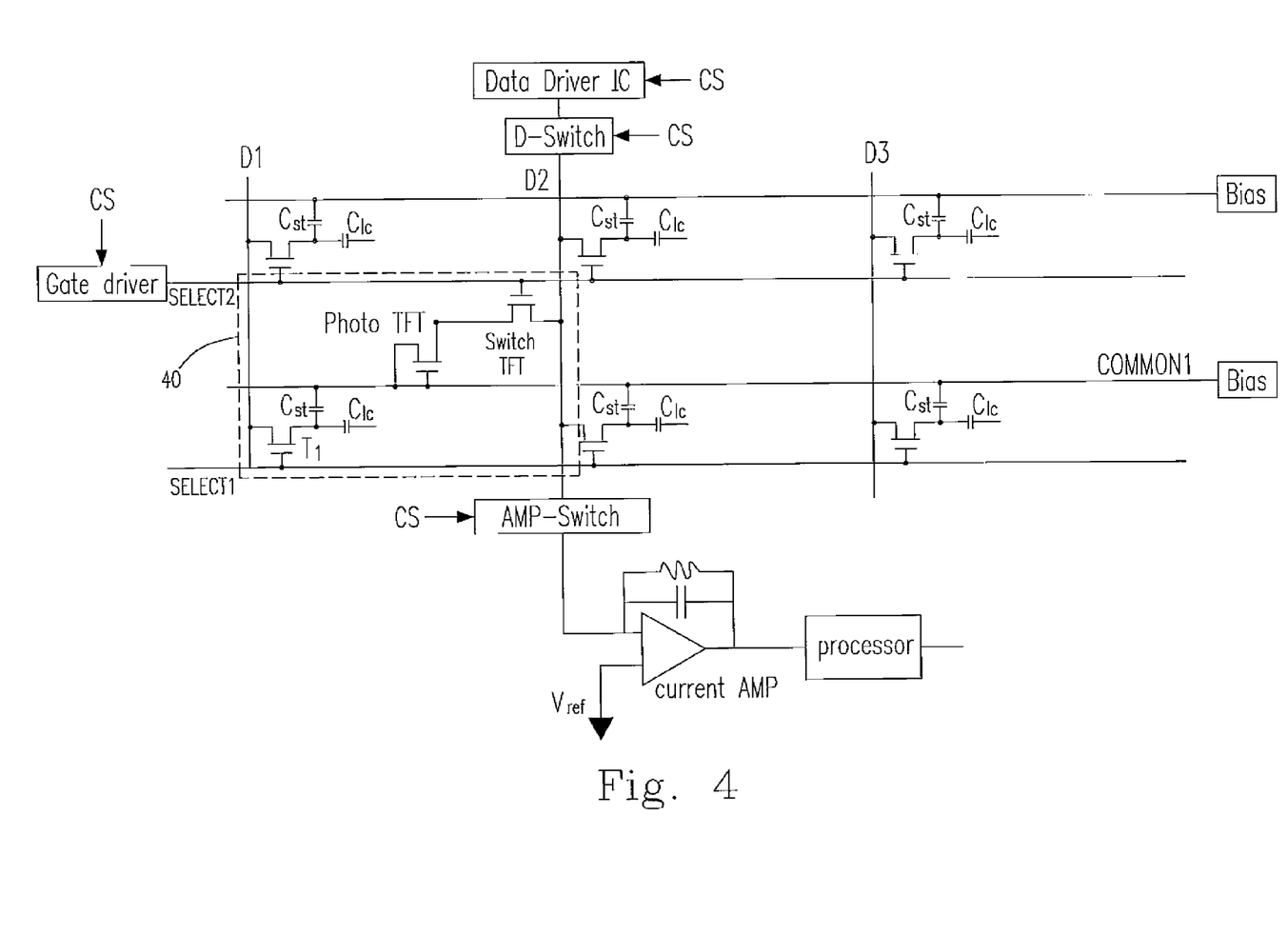
FIG. 4 is a diagram schematically showing the equivalent circuit for a pixel of a first preferred embodiment according to the present invention.

Please refer to FIG. 4, which is a diagram schematically showing the equivalent circuit for a pixel of a first preferred embodiment according to the present invention.

As shown in FIG. 4, the pixel 40 includes a first transistor T1 whose gate terminal is connected to the first gate line SELECT1. The source terminal of the first transistor T1 is connected to the first data line D1, and the drain terminal thereof is connected to the common line COMMON1 through a first capacitor Cst. The photo transistor, Photo TFT, is configured for generating a photo signal and a second transistor Switch TFT electrically connected thereto provides the control for reading out the photo signal. In this case, the gate terminal and the source terminal of the photo transistor are electrically connected to the common line COMMON1, while the drain terminal thereof is electrically connected to the second transistor Switch TFT.

The pixel according to the present invention is distinguishable from the conventional pixel structure in that there is no additional readout line configured in the pixel area 40. Accordingly, the second transistor Switch TFT is electrically connected to the second data line D2 rather than to a conventional readout line. The second data line D2 is further electrically connected to a data driver through a switch, D-Switch, on one end thereof, and to a readout circuit including an amplifier through a further switch, AMP-switch, on the other end thereof. Preferably, the data driver is constructed of a data driving integrated circuit, Data driver IC, and the amplifier is a current amplifier, Current AMP, which is further coupled to a processor.

In the pixel writing duration, the pixel is on a writing voltage level with a pixel voltage applied. The second data line D2 is applied with a control signal of low state, and thereby the switch, i.e. D-Switch, would be switched on so that the second data line D2 would carry a data signal from the external data driver electrically coupled therewith, i.e. Data driver IC. At this time, the AMP-Switch is at the off state, whereby the current amplifier is electrically decoupled with the second data line D2, so that the data writing procedure would not be affected thereby.

In the signal readout duration, on the other hand, a control signal of high state is applied to the D-switch and the D-Switch is thus turned off, so that the DATA driver IC would be electrically disconnected with the second data line D2. Meanwhile, the AMP-Switch is at the on state, i.e. the current AMP is electrically connected with the second data line D2, so that the photo signal generated by the Photo TFT would be transmitted therethrough to the current AMP for being further processed.

Furthermore, the Switch TFT is controlled by a gate pulse applied thereto through the second gate line SELECT2, i.e. the so-called readout gate pulse. The Switch TFT is switched on while the gate pulse is at a high state, e.g. a high voltage level, so that the photo signal generated by the Photo TFT would be transmitted to the current amplifier through the second data line D2. In other words, when the control signal is at the high state, the gate pulse is also at the high state as well, and in this case, the pixel voltage is no longer applied to the pixel and the generated photo signal could be readout as well.

Since the D-switch is electrically disconnected with the second data line D2 while the control signal is at the high state, the Data driver IC would hold the data signal which is not sent out until a further control signal of low state is applied thereto, so as to keep the pixel being input with a correct voltage correspondingly thereto. In a preferred embodiment, accordingly, the Data driver IC serves for holding the signal level when the control signal is at the high state.

After the photo signal is transmitted through the second data line D2 and read out, the Switch TFT would be switched on again due to a subsequent pixel writing gate pulse applied thereto. For avoiding the voltage level of the second data line D2 from being influenced by the biased voltage input thereto through the Photo TFT and the Switch TFT, the biased voltage is preferably a negative one. In this case, the current would not be transmitted to the second data line D2 that is applied with a positive voltage through the Photo TFT, so that the voltage level thereof is never influenced thereby. Moreover, the reference voltage of the current AMP is preferably a suitable negative voltage as well, so as to improve the operation therefor. In a preferred embodiment, the biased voltage is −10V and the reference voltage is −5V.

Figure 5A:
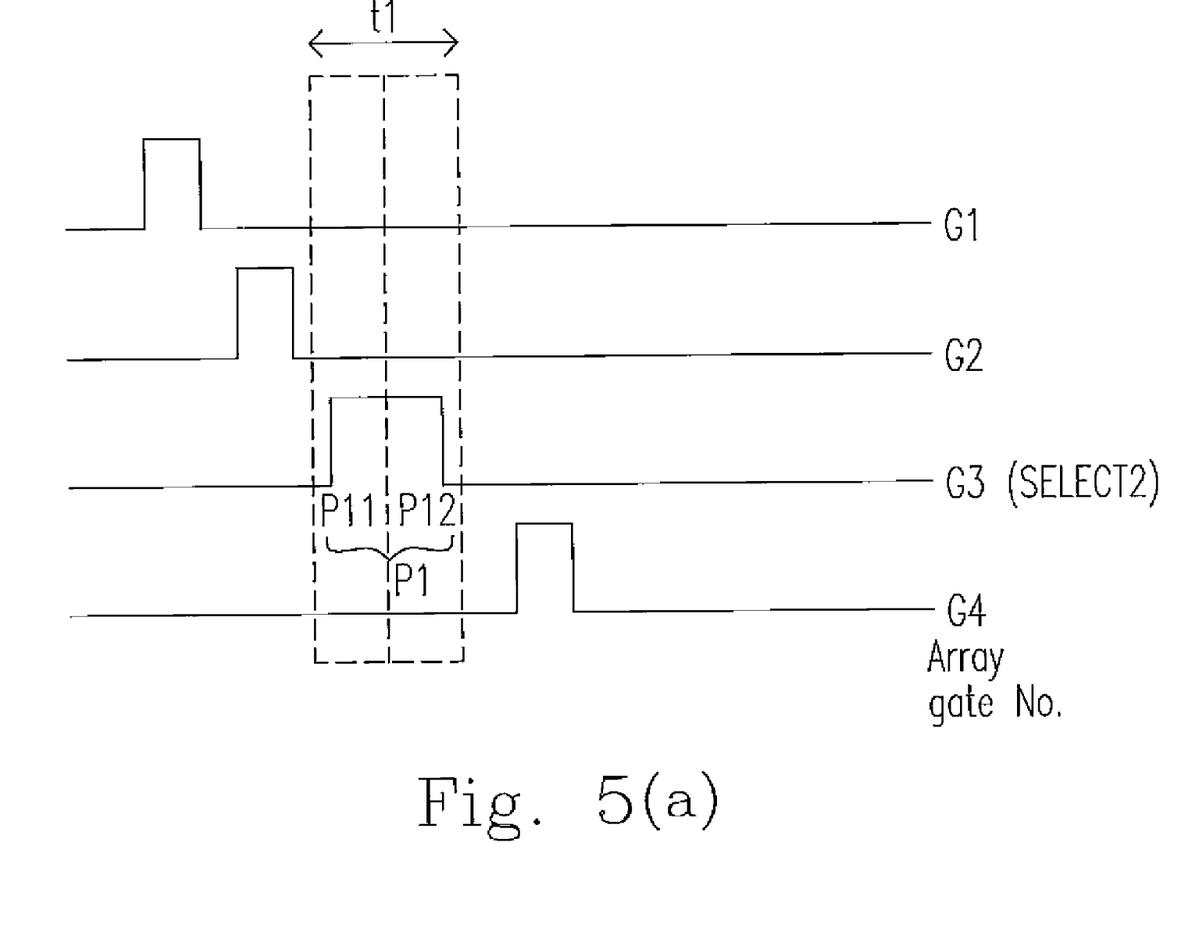
FIGS. 5(a) to 5(c) are diagrams schematically showing the different waveforms of the gate pulse applicable for the pixel of the first preferred embodiment according to the present invention.
Figure 5B:
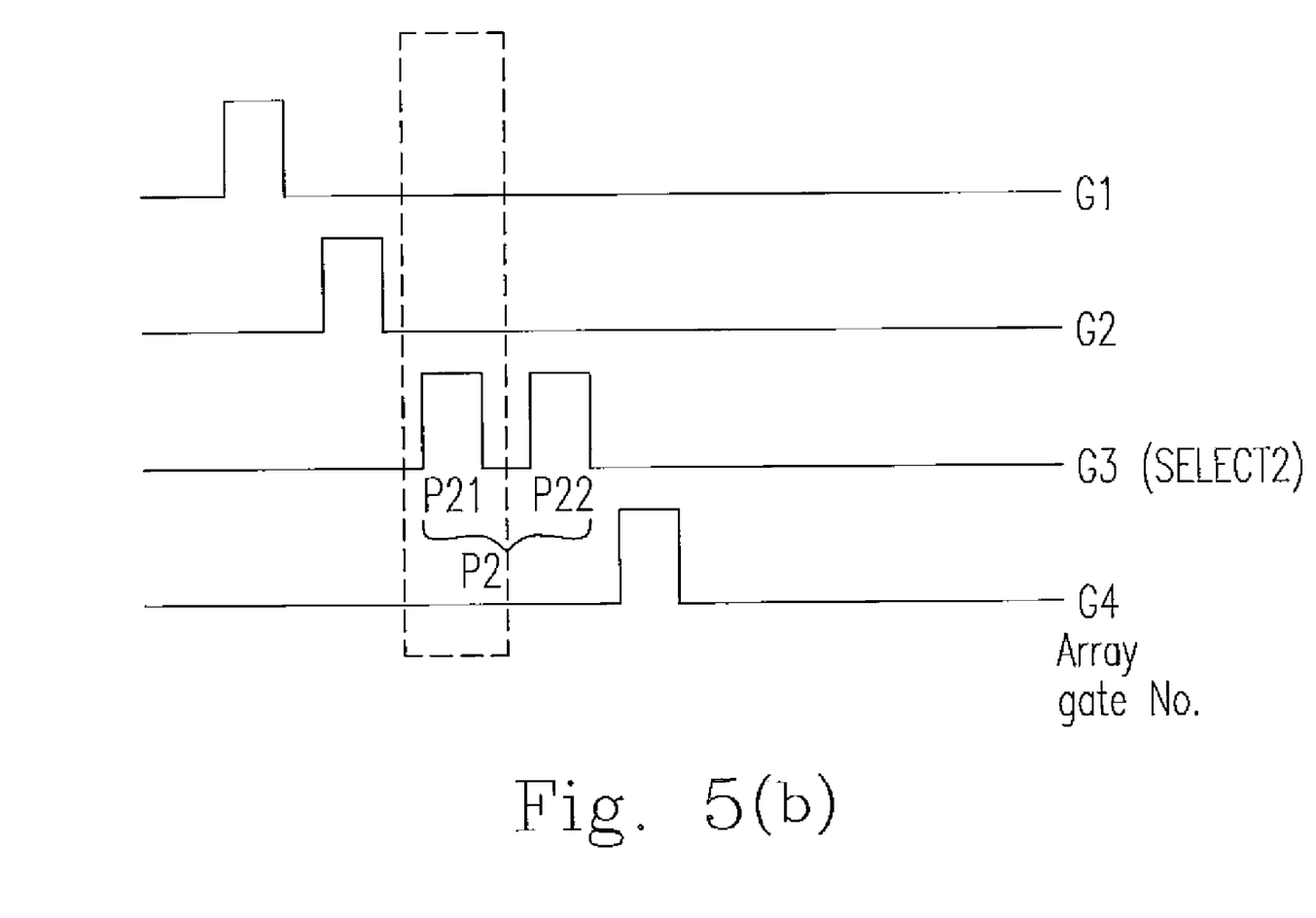
Figure 5C:
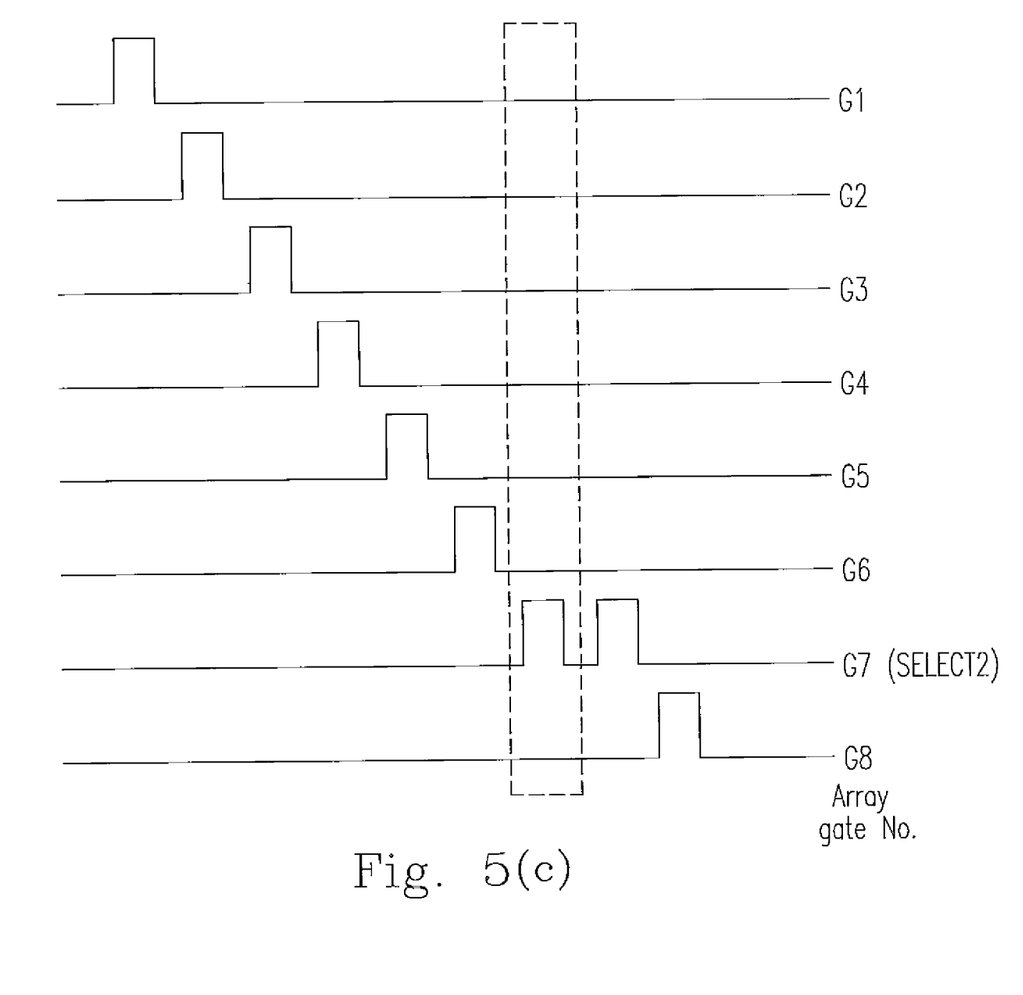

In the present invention, the waveform of the gate pulse applied to the second gate line SELECT2 needs to be well selected for the Switch TFT, so as to allow the data signal transmission as well as the photo signal readout through the same data line D2. With reference to FIGS. 5(*a*) to 5(*c*), the different waveforms of the gate pulse applicable for the pixel of the first preferred embodiment according to the present invention are illustrated. The plurality of gate lines G1, G2, G3 and G4 are subsequently applied with a respective gate pulse when the respective transistor electrically coupled thereto is switched on. In accordance with the first embodiment of the present invention, the gate line G3 is regarded as the second gate line SELECT2 as shown is FIG. 4, and the gate pulse applied thereto is adjustable by means of the Switch TFT.

In more specifics, while the Switch TFT is switched on for a bit longer duration t1, a relatively wide pulse P1 would be applied to the gate line G3, whose pulse width is larger than those applied to the remaining gate lines G1, G2 and G4. Accordingly, the relatively wide pulse P1 may be divided into two portions, wherein the first portion P11 is preferably corresponding to the signal readout duration and the second portion P12 is corresponding to the pixel writing duration, as shown in FIG. 5(*a*). Alternatively, it is also applicable that the Switch TFT is switched on again as soon as the signal readout, so that the gate pulse P2 applied to the gate line G3 may include two separate and subsequent portions P21 and P22 which are respectively corresponding to the signal readout duration and the pixel writing duration, as shown in FIG. 5(*b*). In the present invention, the amount of gate lines depends on an actual demand, e.g. the arrangement density of photo transistors. In a further embodiment, for example, a group of eight gate lines G1 to G8 is also considered and applicable, as shown in FIG. 5(*c*).

Figure 6:
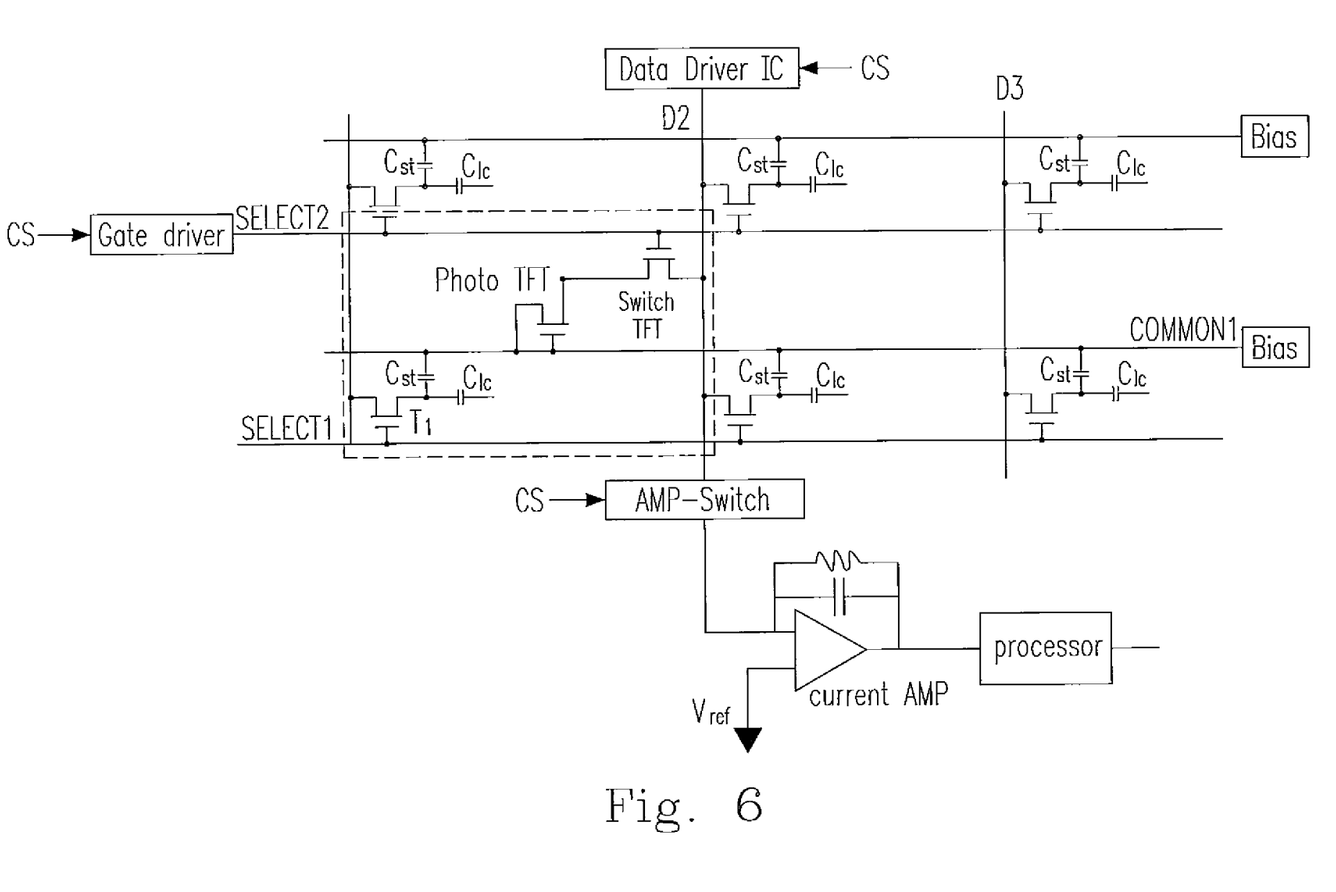
FIG. 6 is a diagram schematically showing the equivalent circuit for a pixel of a second preferred embodiment according to the present invention.

Please refer to FIG. 6, which is a diagram schematically showing the equivalent circuit for a pixel of a second preferred embodiment according to the present invention. In this embodiment, the Data Driver IC itself supports the timing control for electrically connecting or disconnecting to the second data line D2, so that no further switch, e.g. D-switch, needs to be configured therein. Alternatively, the switch, D-Switch, could be also fabricated on the substrate of the display or configured in the Data driver IC, so as to simply the configuration inside the pixel.

Figure 7:
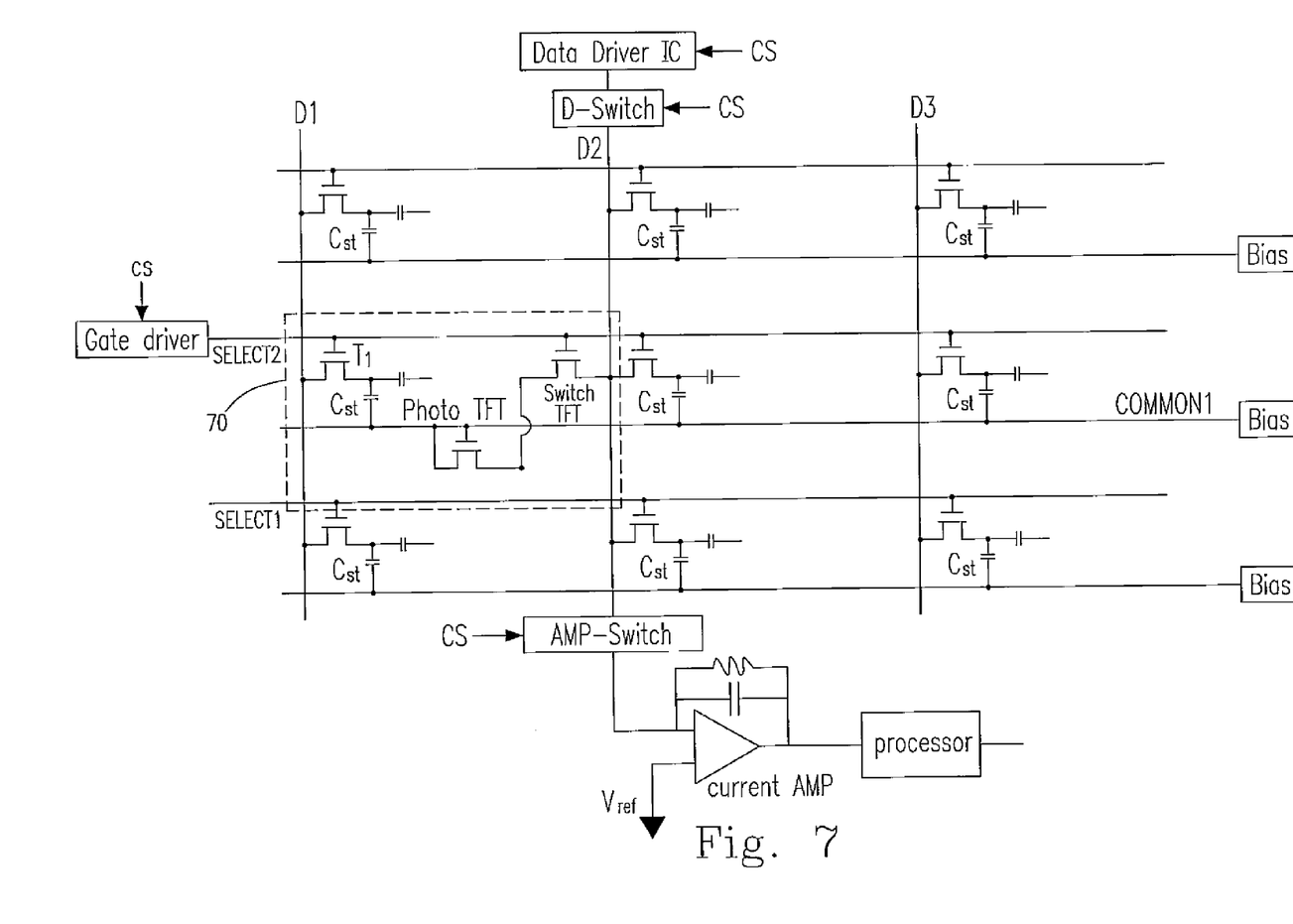
FIG. 7 is a diagram schematically showing the equivalent circuit for a pixel of a third preferred embodiment according to the present invention.

Please refer to FIG. 7, which is a diagram schematically showing the equivalent circuit for a pixel of a third preferred embodiment according to the present invention. The pixel mainly includes a pixel area 70 defined by a first data line D1 and a second data line D2 located adjacent thereto, and a first gate line SELECT1 and a second gate line SELECT2 located adjacent thereto, as shown in FIG. 7. Between the first and second gate lines SELECT1, SELECT2, a common line COMMON1 typically applied with a negative biased voltage or a common voltage is arranged.

As shown in FIG. 7, the pixel includes a first transistor T1 whose gate terminal is connected to the second gate line SELECT2. The source terminal of the first transistor T1 is connected to the first data line D1, and the drain terminal thereof is connected to the common line COMMON1 through a first capacitor Cst. The photo element, i.e. the Photo TFT, is configured for generating a photo signal, and a second transistor Switch TFT electrically connected thereto provides the control for reading out the photo signal. In this case, the gate terminal and the source terminal of the photo transistor Photo TFT are electrically connected to the common line COMMON1, while the drain terminal thereof is electrically connected to the second transistor Switch TFT. The respective gate terminal of the first transistor T1 and the Switch TFT are electrically connected to the same gate line, i.e. the second gate line SELECT2. In addition to the photo transistor Photo TFT, the photo diode is also adoptable for the photo element configured in the pixel.

Similarly, there is no additional readout line configured in the present pixel. Accordingly, the second transistor Switch TFT is electrically connected to the second data line D2 rather than to a conventional readout line. The second data line D2 is further electrically connected to a data driver through a switch, D-Switch, on one end thereof, and to an amplifier through a further switch, AMP-switch, on the other end thereof. Preferably, the data driver is constructed of a data driving integrated circuit, Data driver IC, and the amplifier is a current amplifier, Current AMP, which is further coupled to a processor.

The working principle of such pixel structure is similar to that of the first and second embodiments as shown in FIGS. 4 and 6, respectively, which is not repeatedly illustrated.

Figure 8A:
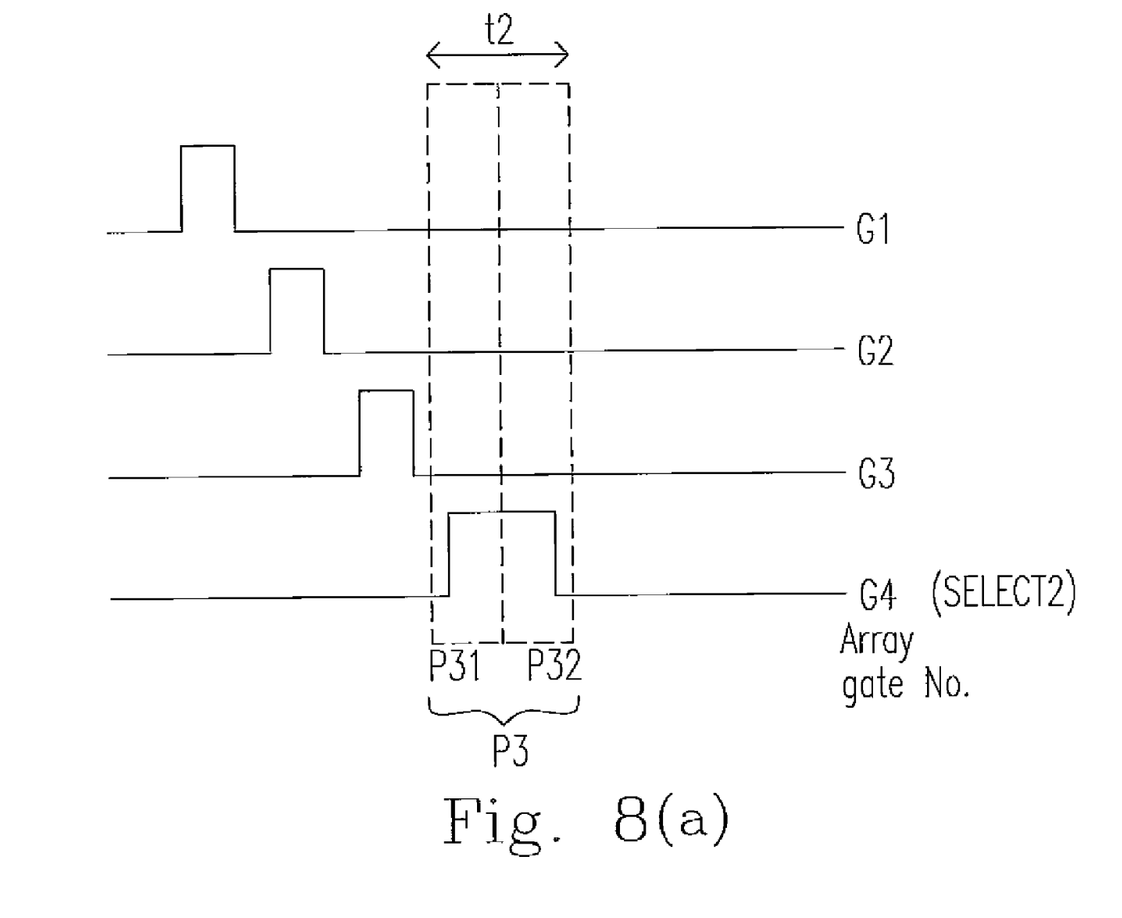
FIGS. 8(a) to 8(c) are diagrams schematically showing the different waveforms of the gate pulse applicable for the pixel of the second preferred embodiment according to the present invention.
Figure 8B:
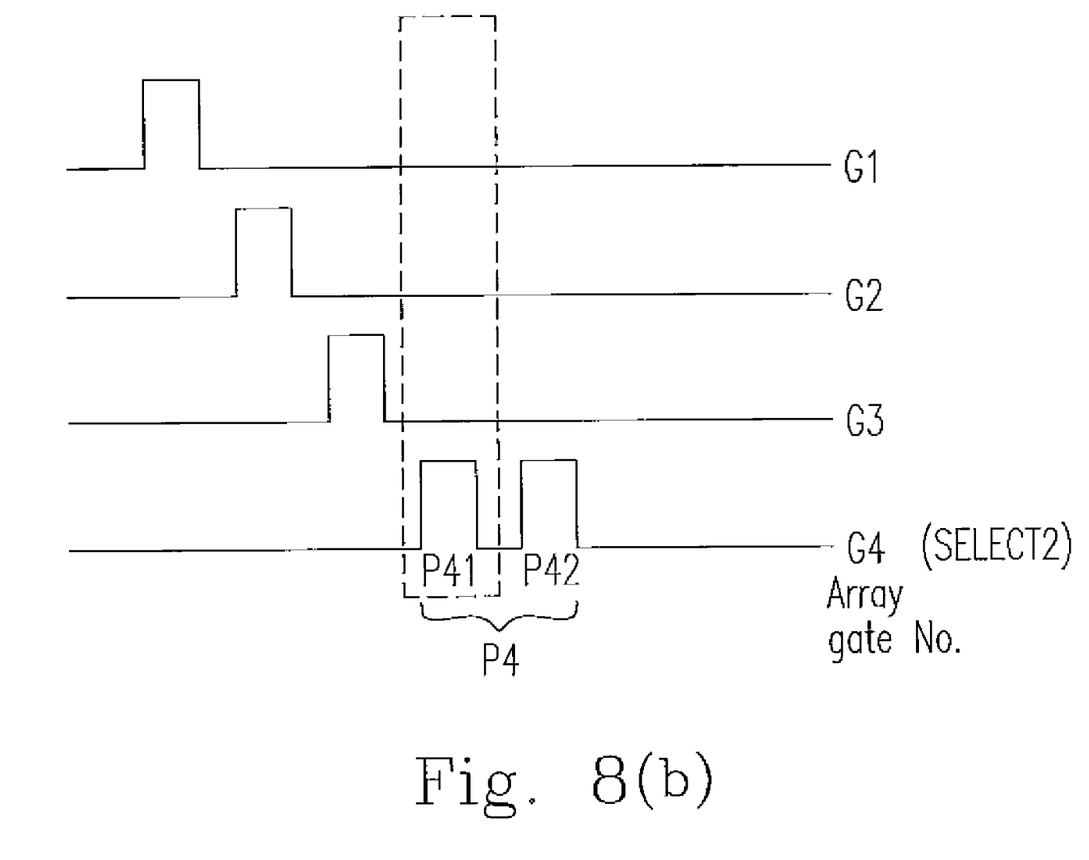
Figure 8C:
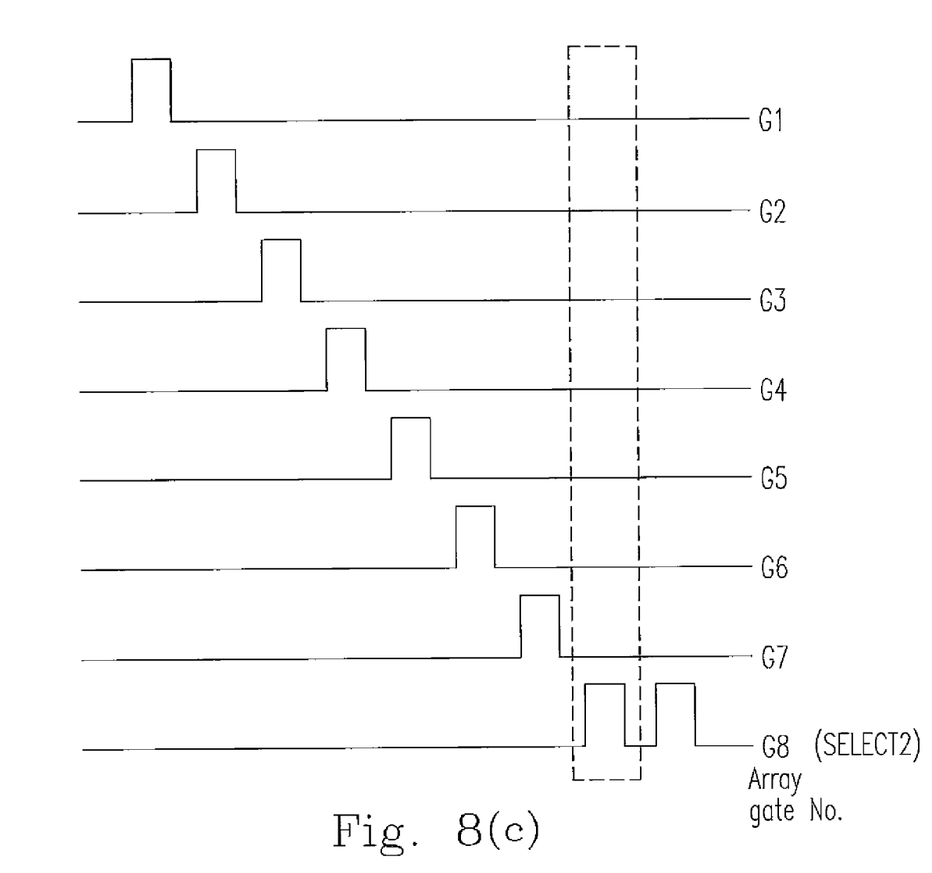

With reference to FIGS. 8(a) to 8(c), the different waveforms of the gate pulse applicable for the pixel of the third preferred embodiment according to the present invention are illustrated. The plurality of gate lines G1, G2, G3 and G4 are subsequently applied with a respective gate pulse when the respective transistor electrically coupled thereto is switched on. In accordance with the third embodiment of the present invention, the gate line G4 is regarded as the second gate line SELECT2 as shown is FIG. 7, and the gate pulse applied thereto is adjustable by means of the Switch TFT. In more specifics, while the Switch TFT is switched on for a bit longer duration t2, a relatively wide pulse P3 would be applied to the second gate line G4, whose pulse width is larger than those applied to the remaining gate lines G1, G2 and G3. Accordingly, the relatively wide pulse P3 may be divided into two portions, wherein the first portion P31 is preferably corresponding to the signal readout duration and the second portion P32 is corresponding to the pixel writing duration, as shown in FIG. 8(a). Alternatively, it is also applicable that the Switch TFT is switched on again as soon as the signal readout, so that the gate pulse P4 applied to the gate line G4 may include two separate and subsequent portions P41 and P42 which are respectively corresponding to the signal readout duration and the pixel writing duration, as shown in FIG. 8(b). In the present invention, the amount of gate lines depends on an actual demand, e.g. the arrangement density of photo transistors. In a further embodiment, for example, a group of eight gate lines G1 to G8 is considered, as shown in FIG. 8(c).

Figure 9:
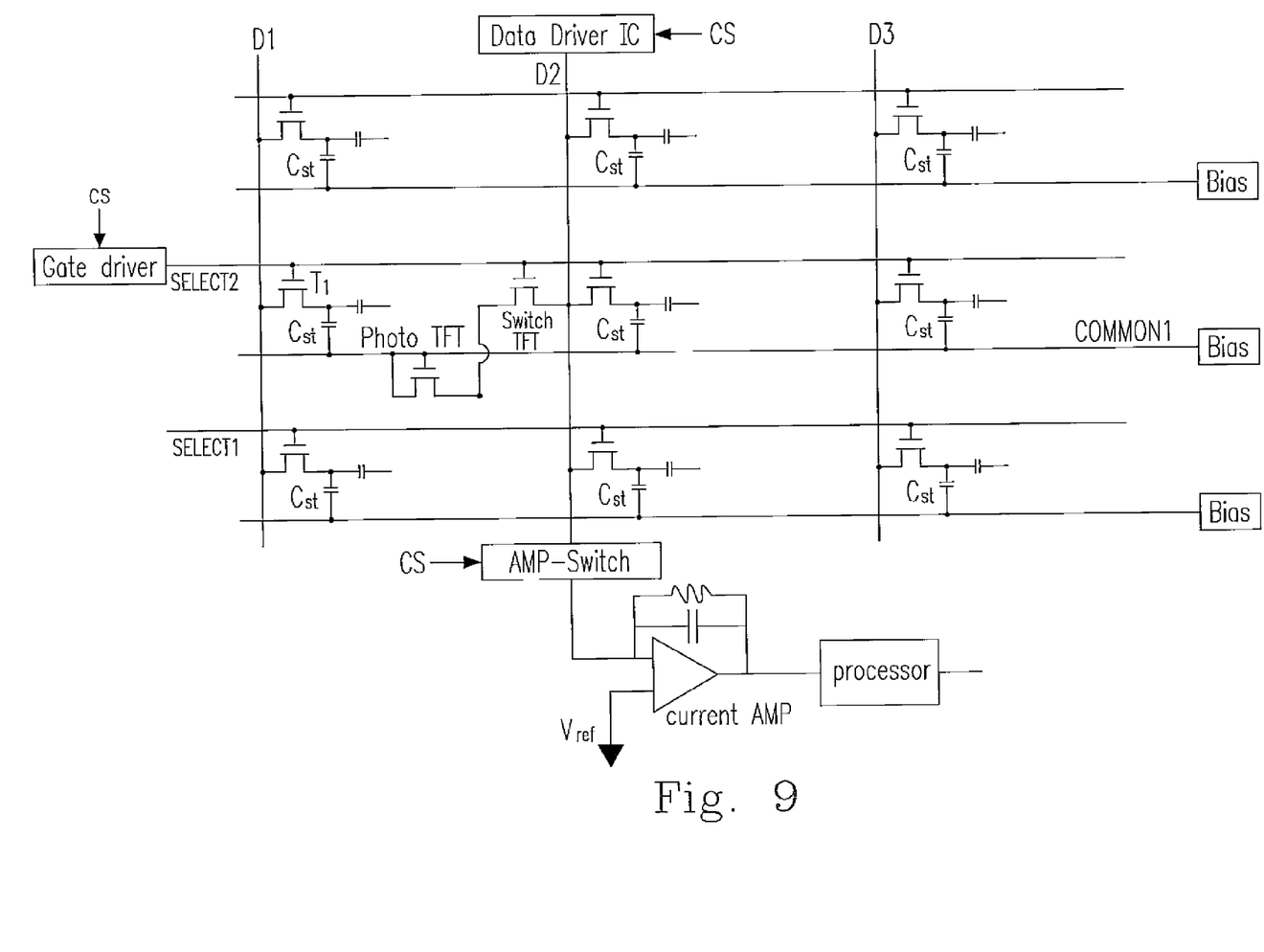
FIG. 9 is a diagram schematically showing the equivalent circuit for a pixel of a fourth preferred embodiment according to the present invention.

Please refer to FIG. 9, which is a diagram schematically showing the equivalent circuit for a pixel of a fourth preferred embodiment according to the present invention. This embodiment is distinguishing from that as shown in FIG. 7 in that the Data Driver IC itself supports the timing control for electrically connecting or disconnecting to the second data line D2, so that no further switch, e.g. D-switch, needs to be configured therein. Alternatively, the switch, D-Switch, could be also fabricated on the substrate of the display or configured in the Data driver IC, so as to simply the configuration inside the pixel.

As above, through the provided method of the present invention, the pixel is advantageous in that no further readout line needs to be configured therein for the data signal transmission and/or the photo signal readout. Accordingly, the mentioned issues of the conventional touch sensitive display are well overcome and the uniformity of lightness therefor is significantly improved. In comparison with the conventional touch display, the present invention is also advantageous in an improvement in yield, which reduces the production cost of the touch display and enhances the display property thereof.

Hence, the present invention not only has novelty and progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A pixel structure of a display, comprising:
   a first data line and a second data line located adjacent thereto;
   a first gate line and a second gate line located adjacent thereto;
   a photo element generating a photo signal;
   a transistor having a first on-off state, a first terminal electrically connected to said second gate line, a second terminal electrically connected to said photo element and a third terminal electrically connected to said second data line;
   a first switch having a second on-off state; and
   a second switch having a third on-off state, wherein:
   said second data line is electrically connected to a data driver on one end thereof and to a readout circuit, having a first input terminal and a second input terminal, on the other end thereof;
   said second data line is electrically connected to said data driver through said first switch and to said first input terminal of said readout circuit through said second switch;
   said second input terminal of said readout circuit continuously receives a same fixed negative reference voltage at any time;
   said second on-off state and said third on-off state are complementary; and
   whenever said first on-off state is in a first on state and said third on-off state is in a second on state, a difference between said photo signal and said fixed negative reference voltage is read by said readout circuit.

2. The pixel structure according to claim 1, wherein said data driver comprises a driving integrated circuit and said first switch configured therein, and the second data line is electrically connected thereto.

3. The pixel structure according to claim 1, wherein said first switch is fabricated on a substrate of said display.

4. The pixel structure according to claim 1, wherein a data signal from said data driver is transmitted through said second data line when said readout circuit is electrically decoupled therewith by said second switch.

5. The pixel structure according to claim 1, wherein said photo signal is transmitted to said readout circuit for being read out and processed thereby through said second data line when said data driver is electrically decoupled therewith by said first switch.

6. The pixel structure according to claim 1, wherein said photo element is one of a photo transistor and a photo diode.

7. The pixel structure according to claim 1, further comprising a common line located between said first gate line and said second gate line.

8. The pixel structure according to claim 7, wherein said common line is provided with a common biased voltage.

9. The pixel structure according to claim 8, wherein said common biased voltage is a negative voltage.

10. The pixel structure according to claim 1, wherein said display is a touch display.

11. The pixel structure according to claim 1, wherein said readout circuit comprises an amplifier.

12. A method for driving a pixel of a display, wherein said pixel comprises a gate line, a first and a second data lines for signal transmission and/or signal readout, a photo element generating a photo signal, and a first switch having a first on-off state, a first terminal electrically connected to said gate line, a second terminal electrically connected to said photo element and a third terminal electrically connected to said second data line, wherein said second data line is electrically connected to a data driver on one end and to a readout circuit, having a first input terminal and a second input terminal, on the other end thereof, and said second data line is electrically connected to said data driver through a second switch having a second on-off state and to said first input terminal of said readout circuit through a third switch having a third on-off state, said method comprising steps of:
- continuously providing a same fixed negative reference voltage to said second input terminal of said readout circuit at any time;
- providing a control signal of a first state to said data driver for electrically coupling said second data line with said data driver, whereby a data signal from said data driver is transmitted through said second data line into said pixel;
- providing a control signal of a second state to said data driver for electrically coupling said second data line with said readout circuit, whereby said photo signal is transmitted to said readout circuit for being read out and processed;
- reading a difference between said photo signal and said fixed negative reference voltage by said readout circuit, whenever said first on-off state is in a first on state and said third on-off state is in a second on state, wherein said second on-off state and said third on-off state are complementary.

13. The method according to claim 12, wherein said second data line is electrically decoupled with said readout circuit when said second data line is provided with said control signal of said first state.

14. The method according to claim 13, wherein said first state is a low state.

15. The method according to claim 12, wherein said second data line is electrically decoupled with said data driver when said second data line is provided with said control signal of said second state.

16. The method according to claim 15, wherein said second state is a high state.

17. The method according to claim 12, wherein said photo signal is transmitted when said first switch is provided with a gate pulse having a first portion corresponding to said second state of said control signal.

18. The method according to claim 17, wherein said data signal is held when said photo signal is transmitted through said second data line.

* * * * *